(12) United States Patent
Perez

(10) Patent No.: US 10,465,351 B1
(45) Date of Patent: Nov. 5, 2019

(54) ANIMAL WASTE-COLLECTING DEVICE

(71) Applicant: Jose Perez, Baldwin Park, CA (US)

(72) Inventor: Jose Perez, Baldwin Park, CA (US)

( * ) Notice: Subject to any disclaimer, the term of this patent is extended or adjusted under 35 U.S.C. 154(b) by 0 days.

(21) Appl. No.: 16/398,474

(22) Filed: Apr. 30, 2019

(51) Int. Cl.
*E01H 1/12* (2006.01)

(52) U.S. Cl.
CPC .................. *E01H 1/1206* (2013.01)

(58) Field of Classification Search
CPC .......... A01K 23/005; E01H 2001/1266; E01H 2001/1206
See application file for complete search history.

(56) References Cited

U.S. PATENT DOCUMENTS

| | | | |
|---|---|---|---|
| 4,852,924 A | 8/1989 | Ines | |
| 5,634,678 A | 6/1997 | Bailey | |
| 5,683,129 A | 11/1997 | Jensen | |
| 6,517,034 B1 * | 2/2003 | Kinchen | B65B 67/1238 248/100 |
| 6,702,349 B2 | 3/2004 | Clements | |
| 7,090,268 B2 | 8/2006 | Borman | |
| 7,407,207 B2 * | 8/2008 | Yilmaz | A01K 23/005 294/1.4 |
| 7,431,361 B2 * | 10/2008 | Pilas | A01K 23/005 294/1.5 |
| 8,177,270 B2 * | 5/2012 | Chen | A01K 23/005 294/1.4 |
| 8,511,728 B2 | 8/2013 | Beaton | |
| 9,420,762 B2 * | 8/2016 | Brasuel | A01K 23/005 |
| 9,650,750 B1 | 5/2017 | Freda | |
| 9,668,457 B1 * | 6/2017 | Irons | A01K 23/005 |
| D795,510 S | 8/2017 | Griffin | |
| 2007/0222240 A1 | 9/2007 | Sherman | |
| 2009/0045639 A1 * | 2/2009 | Shalhoub | A01K 23/005 294/1.5 |
| 2009/0096227 A1 | 4/2009 | Pender | |

FOREIGN PATENT DOCUMENTS

CA    2771367    9/2012

* cited by examiner

*Primary Examiner* — Stephen A Vu
(74) *Attorney, Agent, or Firm* — Kyle A. Fletcher, Esq.

(57) ABSTRACT

The animal waste-collecting device is adapted for use with a companion animal. The animal waste-collecting device is configured for use in the collection of the excrement of the companion animal. The animal waste-collecting device comprises a telescopic structure, a ring mount, a capture head, and a lamp. The ring mount attaches the capture head to the telescopic structure such that the faces of the capture head rotate relative to the center axis of the telescopic shaft. The capture head is configured for use with a disposable collection bag. The disposable collection bag attaches to the capture head such that the excrement is captured during the elimination process of the companion animal.

18 Claims, 6 Drawing Sheets

ANIMAL WASTE-COLLECTING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fixed constructions including implements for cleaning a street, more specifically, a hand implement for picking up animal excrement. (E01H0/1206)

SUMMARY OF INVENTION

The animal waste-collecting device is adapted for use with a companion animal. The animal waste-collecting device is configured for use in the collection of the excrement of the companion animal. The animal waste-collecting device comprises a telescopic structure, a ring mount, a capture head, and a lamp. The ring mount attaches the capture head to the telescopic structure such that the faces of the capture head rotate relative to the center axis of the telescopic shaft. The capture head is configured for use with a disposable collection bag. The disposable collection bag attaches to the capture head such that the excrement is captured during the elimination process of the companion animal.

These together with additional objects, features and advantages of the animal waste-collecting device will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal waste-collecting device in detail, it is to be understood that the animal waste-collecting device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal waste-collecting device.

It is therefore important that the claims be regarded as including such equivalent construction insofar as they do not depart from the spirit and scope of the animal waste-collecting device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
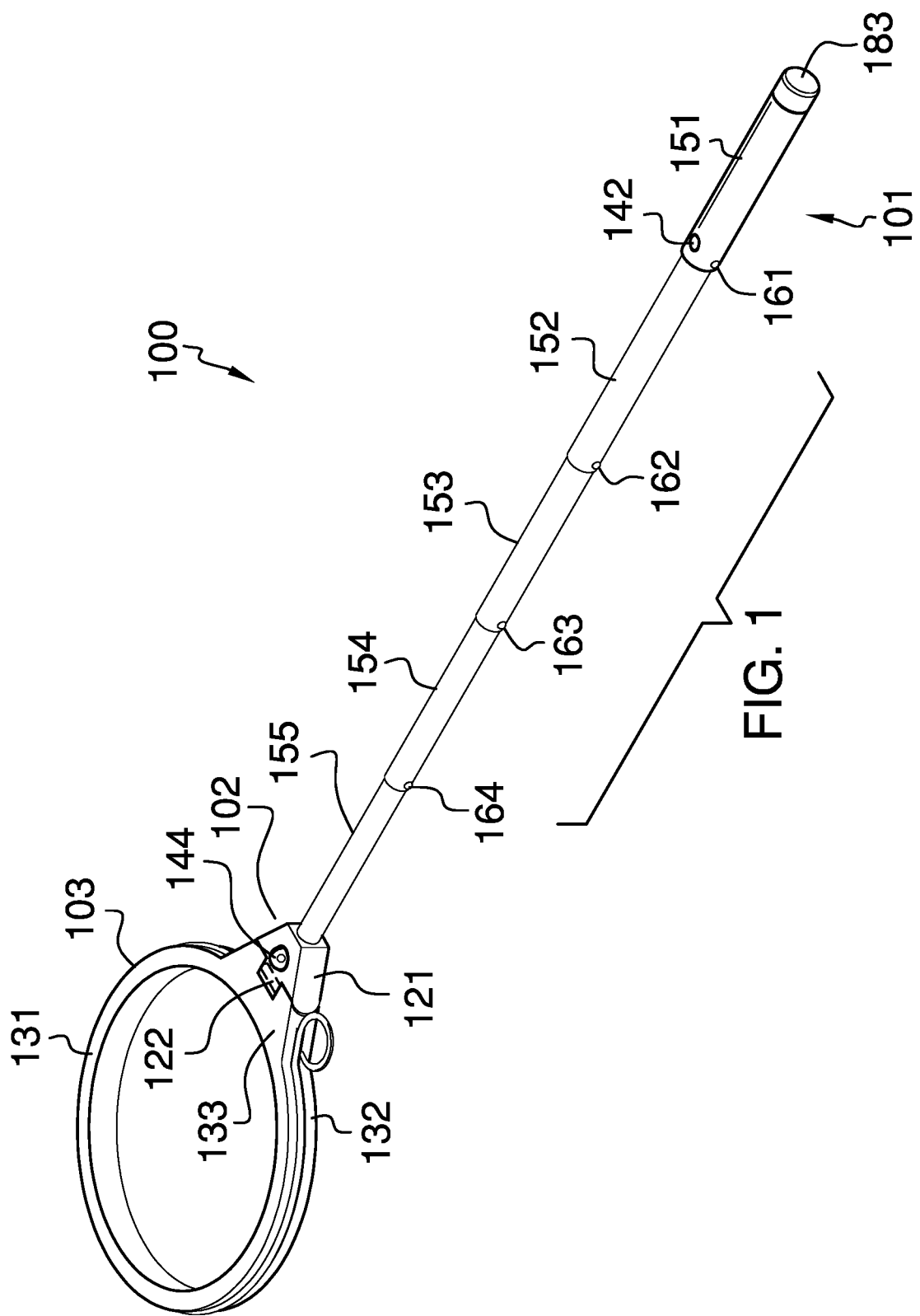
FIG. 1 is a perspective view of an embodiment of the disclosure.
Figure 2:
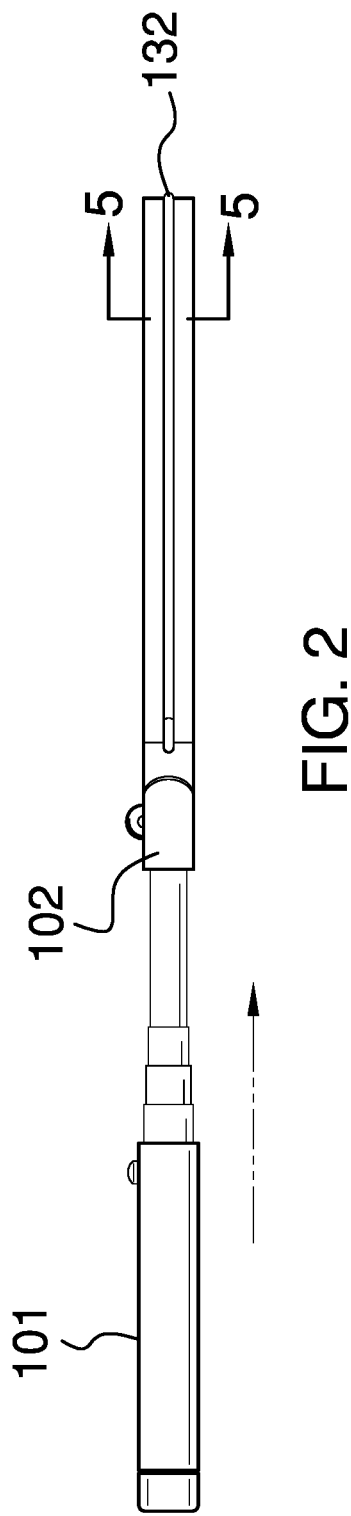
FIG. 2 is a side view of an embodiment of the disclosure.
Figure 3:
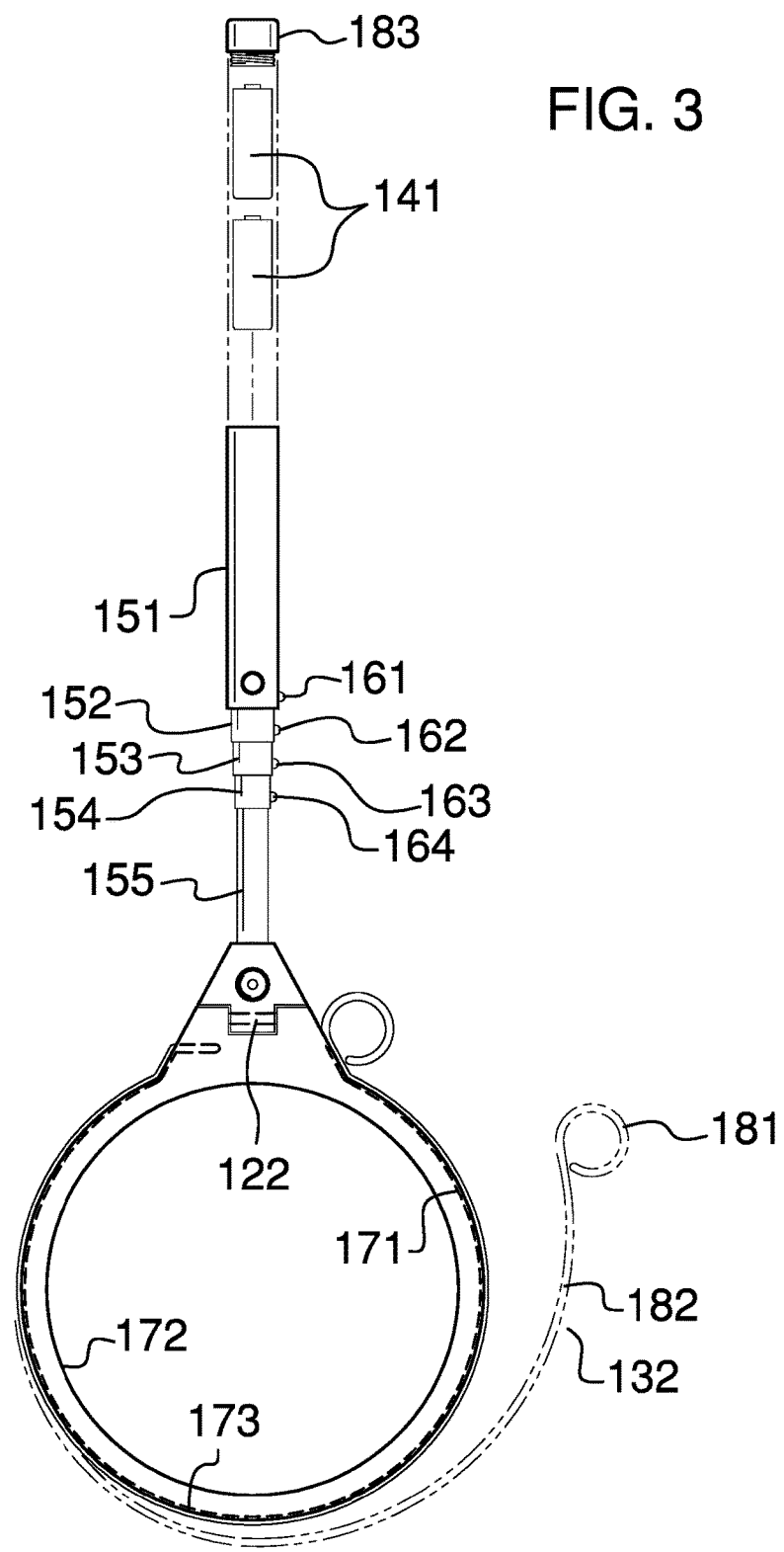
FIG. 3 is a front view of an embodiment of the disclosure.
Figure 4:
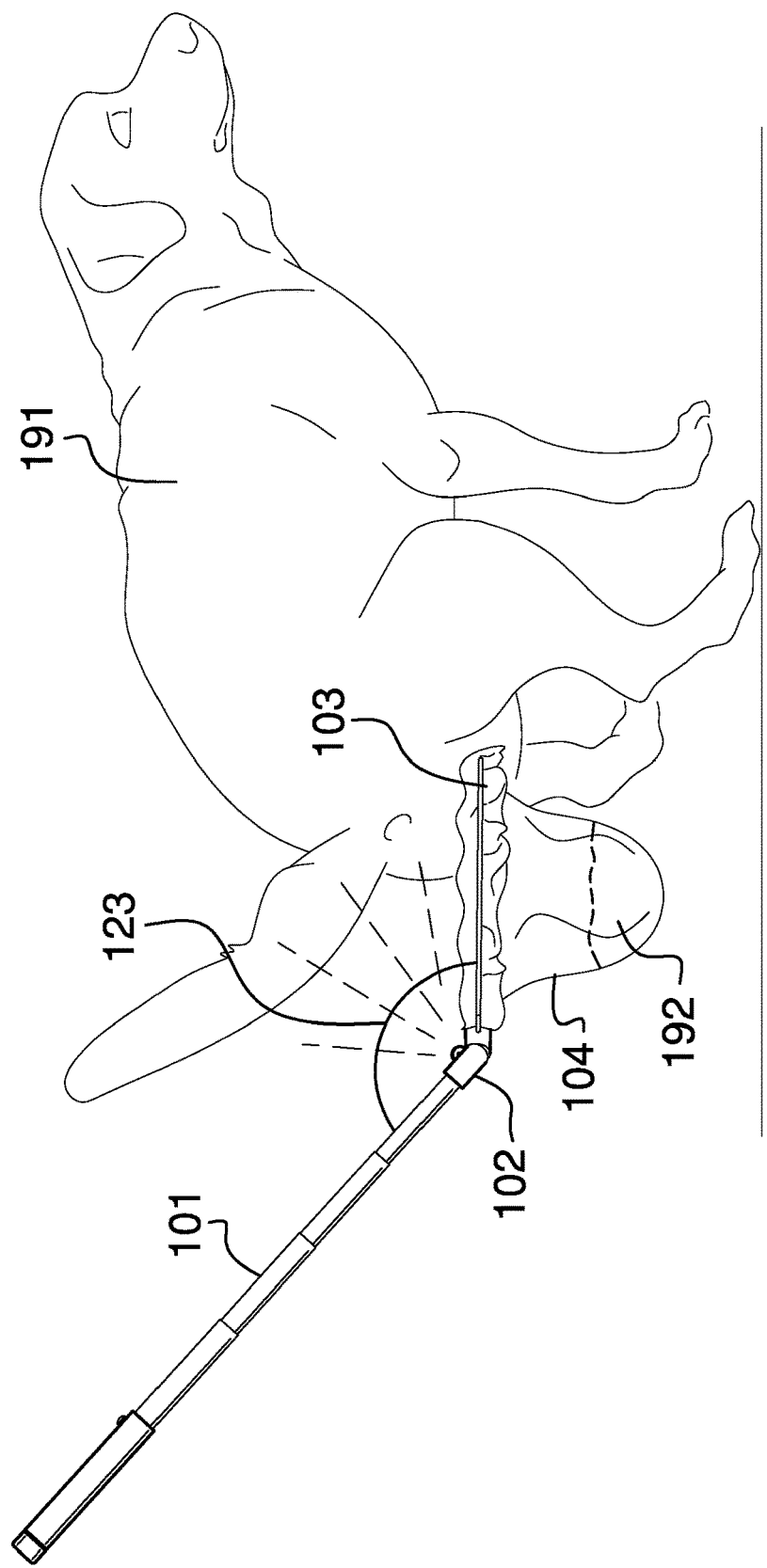
FIG. 4 is an in-use view of an embodiment of the disclosure.
Figure 5:
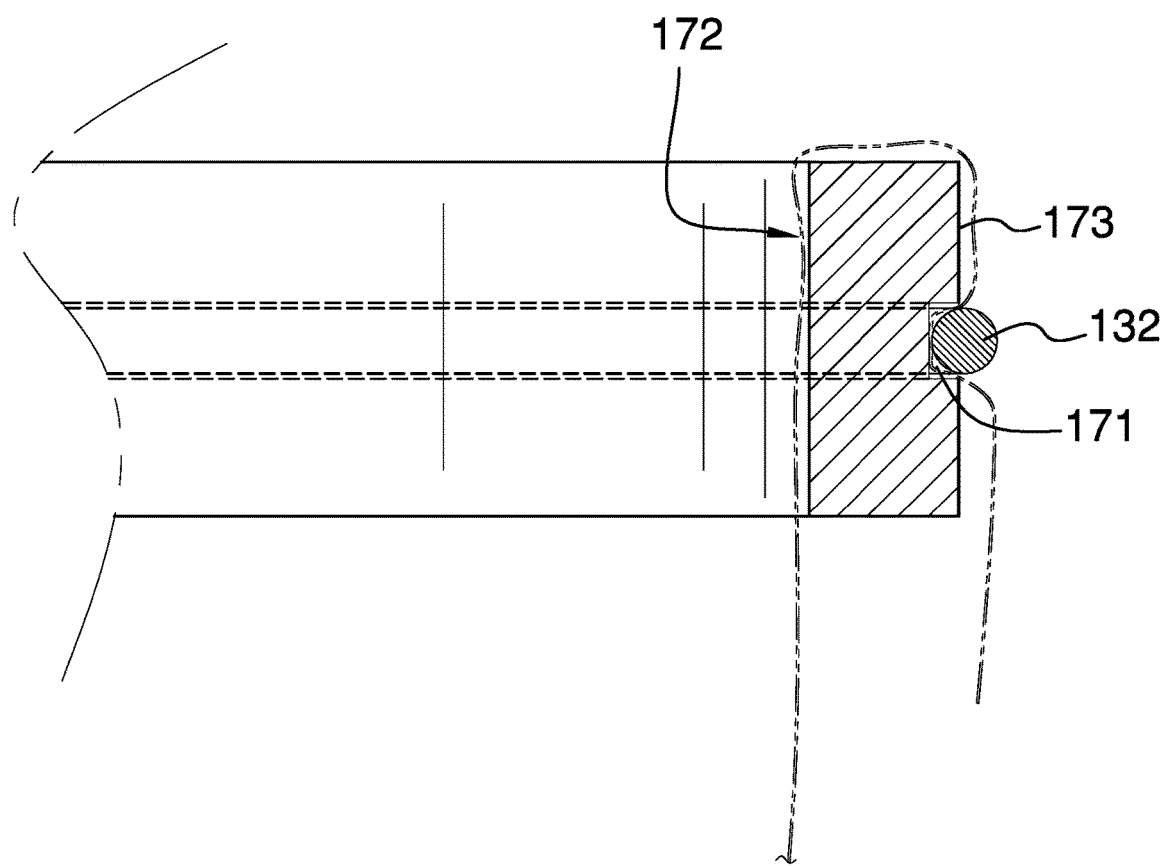
FIG. 5 is a cross-sectional view of an embodiment of the disclosure across 5-5 as shown in FIG. 2.
Figure 6:
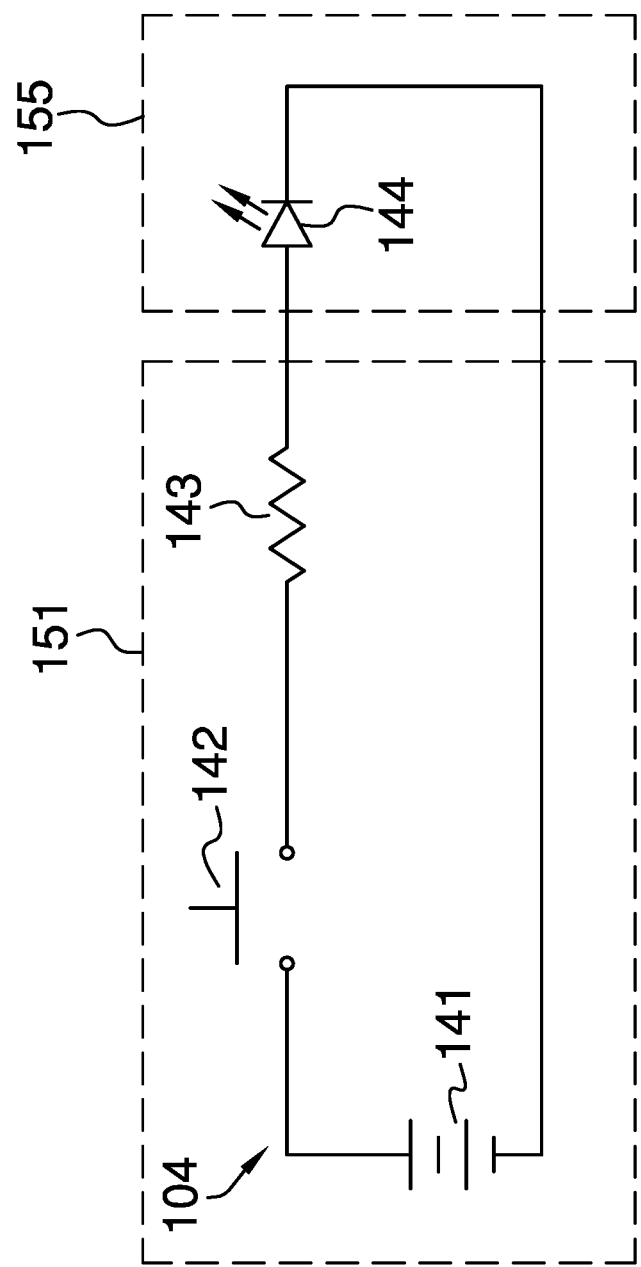
FIG. 6 is a schematic view of an embodiment of the disclosure.

Detailed reference will now be made to one or more potential embodiments of the disclosure, which are illustrated in FIGS. 1 through 6.

The animal waste-collecting device 100 (hereinafter invention) is adapted for use with a companion animal 191. The invention 100 is configured for use in the collection of the excrement 192 of the companion animal 191. The invention 100 comprises a telescopic structure 101, a ring mount 102, a capture head 103, and a lamp 104. The ring mount 102 attaches the capture head 103 to the telescopic structure 101 such that the faces of the capture head 103 rotate relative to the center axis of the telescopic shaft. The capture head 103 is configured for use with a disposable collection bag 105. The disposable collection bag 105 attaches to the capture head 103 such that the excrement 192 is captured during the elimination process of the companion animal 191.

The disposable collection bag 105 is a bag used to collect the excrement 192 eliminated by the companion animal 191. A commercially available trash bag is suitable for use as the disposable collection bag 105. The companion animal 191 is defined in greater detail elsewhere in this disclosure.

The telescopic structure 101 is an extension apparatus. The telescopic structure 101 is a composite prism-shaped structure. The telescopic structure 101 forms a telescopic handle. The telescopic structure 101 extends the reach of the invention 100 from the capture head 103 to a user. Specifically, the telescopic structure 101 extends the reach between the capture head 103 and the battery 141 cap 183. The telescopic structure 101 comprises a plurality of arms 111 and one or more detents 112.

Each of the plurality of arms 111 is a hollow prism-shaped structure. Each of the plurality of arms 111 are interconnected to form the telescopic structure 101. Each of the plurality of arms 111 are assembled to form a composite prism structure. The plurality of arms 111 comprises a first arm 151, a second arm 152, a third arm 153, a fourth arm 154, and a fifth arm 155. Each of the one or more detents 112 is a detent used to lock an initial arm selected from the plurality of arms 111 into a fixed position relative to an adjacent arm selected from the plurality of arms 111. The one or more detents 112 comprises a first detent 161, a second detent 162, a third detent 163, and a fourth detent 164.

The first arm 151 further comprises the battery 141 cap 183. The battery 141 cap 183 is a lid that is used to enclose the end of the first arm 151 that is distal from the second arm 152. The battery 141 cap 183 encloses a battery 141 within the first arm 151 for storage.

The telescopic structure 101 is a telescopic apparatus that comprises the first arm 151, the second arm 152, and the first detent 161. The first detent 161 is a mechanical device that locks and secures the first arm 151 to the second arm 152. The first arm 151 is a hollow prism that is further defined with an inner dimension. The second arm 152 is a hollow prism that is further defined with an outer dimension. The second arm 152 is geometrically similar to the first arm 151. The span of the outer dimension of the second arm 152 is lesser than the span of the inner dimension of the first arm 151 such that the second arm 152 inserts into the first arm 151 in a telescopic fashion. The span of the length of the telescopic structure 101 adjusts by adjusting the relative position of the second arm 152 within the first arm 151.

The position of the second arm 152 relative to the first arm 151 is held in position using the first detent 161. The first detent 161 is selected from the group consisting of a cotter pin, a G snap collar, a cam lock collar, a threaded clutch, a split collar lock, and a spring-loaded ball lock.

The telescopic structure 101 further comprises the third arm 153 and the second detent 162. The second detent 162 is a mechanical device that locks and secures the third arm 153 to the second arm 152. The second arm 152 is a hollow prism that is further defined with an inner dimension. The third arm 153 is a hollow prism that is further defined with an outer dimension. The third arm 153 is geometrically similar to the second arm 152. The span of the outer dimension of the third arm 153 is lesser than the span of the inner dimension of the second arm 152 such that the third arm 153 inserts into the second arm 152 in a telescopic fashion. The span of the length of the telescopic structure 101 adjusts by adjusting the relative position of the third arm 153 within the second arm 152.

The position of the third arm 153 relative to the second arm 152 is held in position using the second detent 162. The second detent 162 is selected from the group consisting of a cotter pin, a G snap collar, a cam lock collar, a threaded clutch, a split collar lock, and a spring-loaded ball lock.

The telescopic structure 101 further comprises the fourth arm 154 and the third detent 163. The third detent 163 is a mechanical device that locks and secures the fourth arm 154 to the third arm 153. The third arm 153 is further defined with an inner dimension. The fourth arm 154 is a hollow prism that is further defined with an outer dimension. The fourth arm 154 is geometrically similar to the third arm 153. The span of the outer dimension of the fourth arm 154 is lesser than the span of the inner dimension of the third arm 153 such that the fourth arm 154 inserts into the third arm 153 in a telescopic fashion. The span of the length of the telescopic structure 101 adjusts by adjusting the relative position of the fourth arm 154 within the third arm 153.

The position of the fourth arm 154 relative to the third arm 153 is held in position using the third detent 163. The third detent 163 is selected from the group consisting of a cotter pin, a G snap collar, a cam lock collar, a threaded clutch, a split collar lock, and a spring-loaded ball lock.

The telescopic structure 101 further comprises the fifth arm 155, and the fourth detent 164. The fourth detent 164 is a mechanical device that locks and secures the fifth arm 155 to the fourth arm 154. The fourth arm 154 is further defined with an inner dimension. The fifth arm 155 is a hollow prism that is further defined with an outer dimension. The fifth arm 155 is geometrically similar to the fourth arm 154. The span of the outer dimension of the fifth arm 155 is lesser than the span of the inner dimension of the fourth arm 154 such that the fifth arm 155 inserts into the fourth arm 154 in a telescopic fashion. The span of the length of the telescopic structure 101 adjusts by adjusting the relative position of the fifth arm 155 within the fourth arm 154.

The position of the fifth arm 155 relative to the fourth arm 154 is held in position using the fourth detent 164. The fourth detent 164 is selected from the group consisting of a cotter pin, a G snap collar, a cam lock collar, a threaded clutch, a split collar lock, and a spring-loaded ball lock.

The ring mount 102 is a fastening apparatus. The ring mount 102 is a rotating structure. The ring mount 102 attaches the capture head 103 to the telescopic structure 101 such that the capture head 103 rotates relative to the telescopic structure 101. The ring mount 102 is a locking structure. The ring mount 102 locks such that the cant 123 between the capture head 103 and the center axis of the telescopic structure 101 can be fixed into position. The ring mount 102 comprises a rectilinear disk structure 121 and a locking hinge 122. The ring mount 102 is further defined with a cant 123.

The rectilinear disk structure 121 is a disk-shaped structure formed in an irregular prism shape. The irregular prism shape of the rectilinear disk structure 121 is a rectilinear block structure. The rectilinear disk structure 121 attaches to the end of the fifth arm 155 that is distal from the fourth arm 154. The rectilinear disk structure 121 forms an anchor point to which the capture head 103 attaches.

The locking hinge 122 is a fastening structure. The locking hinge 122 attaches the capture head 103 to the ring mount 102 such that the position of the capture head 103 rotates relative to the ring mount 102. The locking hinge 122 fixes the position of the capture head 103 relative to the ring mount 102 such that the cant 123 between the capture head 103 and the center axis of the telescopic structure 101 is adjustable.

The cant 123 is an angle that is formed between the faces of the disk structure of the capture head 103 and the center axis of the composite prism structure of the telescopic structure 101. The locking hinge 122 adjusts the cant 123. The cant 123 sets the position of the disposable collection bag 105 relative to the companion animal 191 such that the disposable collection bag 105 is in an optimal position to receive the excrement 192 eliminated by the companion animal 191.

The capture head 103 is a ring structure. The capture head 103 is a disk-shaped structure. The capture head 103 is configured to receive a disposable collection bag 105. The ring structure of the capture head 103 is configured to allow a companion animal 191 to deposit excrement 192 into the disposable collection bag 105 through the open center of the capture head 103. The capture head 103 comprises a capture ring 131, a capture spring 132, and a fastening plate 133.

The capture ring 131 is a ring structure. The capture ring 131 is a disk-shaped structure. The disposable collection bag 105 attaches to the capture ring 131 such that the disposable collection bag 105 inserts through the center aperture of the capture ring 131. The capture ring 131 is positioned relative to the companion animal 191 such that the eliminated excrement 192 will fall through the center aperture of the capture ring 131 into the disposable collection bag 105. The capture ring 131 comprises a perimeter groove 171, an inner perimeter 172, and an outer perimeter 173.

The perimeter groove 171 is a slot that is formed in the outer perimeter 173 of the capture ring 131. The outer perimeter 173 forms the lateral face of the disk structure of the capture head 103. The outer perimeter 173 is defined in greater detail elsewhere in this disclosure. The inner perimeter 172 is the perimeter of the aperture that creates the ring aperture formed through the capture ring 131. The inner perimeter 172 is defined in greater detail elsewhere in this disclosure.

The capture spring 132 is a semi-rigid structure. The capture spring 132 attaches to the outer perimeter 173 of the capture ring 131. The capture spring 132 secures the disposable collection bag 105 to the capture ring 131. The capture spring comprises a semi-rigid shaft 181 and a finger loop 182.

The semi-rigid shaft 181 is a semi-rigid structure. The semi-rigid shaft 181 has an elastic nature. The semi-rigid shaft 181 has a prism shape. A congruent end of the prism structure of the semi-rigid shaft 181 attaches to the outer perimeter 173 of the capture ring 131 in the manner of a cantilever. The perimeter groove 171 is sized such that the semi-rigid shaft 181 compresses when the semi-rigid shaft 181 inserts into the perimeter groove 171. The finger loop 182 is a loop that is formed in the free end of the semi-rigid shaft 181.

The elastic nature of the semi-rigid shaft 181 acts as a spring. Specifically, when the semi-rigid shaft 181 inserts between the edges of the perimeter groove 171, a compressive force is applied to the semi-rigid shaft 181. The elasticity of the semi-rigid shaft 181 creates a force that opposes the displacement created force created by the perimeter groove 171. The displacing force places a strain against the perimeter groove 171 such that a clamping force this created that holds the semi-rigid shaft 181 in the perimeter groove 171. When the disposable collection bag 105 is positioned between the semi-rigid shaft 181 and the perimeter groove 171, the semi-rigid shaft 181 attach the disposable collection bag 105 to the capture head 103.

The fastening plate 133 is an irregular disk structure that attaches to the outer perimeter 173 of the capture ring 131. The fastening plate 133 forms the structure of the capture head 103 that attaches to the ring mount 102. The locking hinge 122 attaches the fastening plate 133 to the rectilinear disk structure 121 such that the fastening plate 133 rotates relative to the rectilinear disk structure 121.

The lamp 104 is an electric circuit. The lamp 104 generates illumination that can be used to align the capture head 103 and the disposable collection bag 105 such that the eliminated excrement 192 will fall into the disposable collection bag 105. The lamp 104 comprises a battery 141, a switch 142, a limit resistor 143, and one or more LEDs 144.

The battery 141, the switch 142, the limit resistor 143, and the one or more LEDs 144 are electrically connected to form a series circuit.

The battery 141 is an electrochemical device. The battery 141 converts chemical potential energy into the electrical energy used to power the lamp 104. The switch 142 is a well-known and documented electrical circuit element. The switch 142 controls the flow of electricity through the series electrical circuit that forms the lamp 104. The limit resistor 143 is a well-known and documented electrical circuit element. The limit resistor 143 is placed in series with the one or more LEDs 144 such that the limit resistor 143 will limit the amount of electric current that flows through the one or more LEDs 144. Each of the one or more LEDs 144 is a two-terminal semiconducting device. Each of the one or more LEDs 144 illuminates when an electric current flows through any selected LED.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Bag: As used in this disclosure, a bag is a container made of a flexible material. The bag has a single opening which allows the bag to receive the items to be contained.

Battery: As used in this disclosure, a battery is a chemical device consisting of one or more cells, in which chemical energy is converted into electricity and used as a source of power. Batteries are commonly defined with a positive terminal and a negative terminal.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cap: As used in this disclosure, a cap is a protective cover that encloses a space or opening.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Companion Animal: As used in this disclosure, a companion animal is a domesticated animal that is maintained primarily for companionship. A companion animal is often referred to as a pet.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar. Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Extension Apparatus: As used in this disclosure, an extension apparatus is a mechanical structure that is used to extend or bridge the reach between any two objects.

Reach: As used in this disclosure, reach refers to a span of distance between any two objects.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Groove: As used in this disclosure, a groove is an open channel or trough used to guide the motion of an object.

Hinge: As used in this disclosure, a hinge is a device that permits the turning, rotating, or pivoting of a first object relative to a second object. A hinge designed to be fixed into a set position after rotation is called a locking hinge.

Lamp: As used in this disclosure, a lamp is an electrical device that generates visible light to illuminate objects so they can be seen.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Relaxed Shape: As used in this disclosure, a structure is considered to be in its relaxed state when no shear, strain, or torsional forces are being applied to the structure.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Ring: As used in this disclosure, a ring is a term that is used to describe a disk-like structure through which an aperture is formed. Rings are often considered loops.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Slot: As used in this disclosure, a slot is a long narrow cavity or aperture that is formed in or through an object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Telescopic: As used in this disclosure, telescopic is an adjective that describes an object made of sections that fit or slide into each other such that the object can be made longer or shorter by adjusting the relative positions of the sections.

Trash Bag: As used in this disclosure, a trash bag is a disposable bag formed from a sheeting that is used to contain trash and other refuse for in a manner suitable for disposal. Trash bags are often used to line a waste container.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A waste collection device comprising
a telescopic structure, a ring mount, a capture head, and a lamp;
wherein the ring mount attaches the capture head to the telescopic structure such that faces of the capture head rotate relative to a center axis of the telescopic shaft;
wherein the lamp is an electric circuit that generates illumination;
wherein the waste collection device is adapted for use with a companion animal;
wherein the waste collection device is configured for use in the collection of the excrement of the companion animal;
wherein the capture head is configured for use with a disposable collection bag;
wherein the disposable collection bag attaches to the capture head such that the excrement is captured during the elimination process of the companion animal;
wherein the telescopic structure is an extension apparatus;
wherein the telescopic structure is a composite prism-shaped structure;
wherein the telescopic structure forms a telescopic handle;
wherein the telescopic structure extends the reach of the waste collection device;
wherein the telescopic structure comprises a plurality of arms and one or more detents;
wherein each of the plurality of arms are interconnected to form the telescopic structure;
wherein each of the one or more detents is a detent used to lock an initial arm selected from the plurality of arms into a fixed position relative to an adjacent arm selected from the plurality of arms.

2. The waste collection device according to claim 1
wherein each of the plurality of arms is a hollow prism-shaped structure;
wherein each of the plurality of arms are assembled to form a composite prism structure.

3. The waste collection device according to claim 2
wherein the plurality of arms comprises a first arm and a second arm
wherein the one or more detents comprises a first detent;
wherein the first detent is a mechanical device that locks and secures the first arm to the second arm;
wherein the first arm is a hollow prism that is further defined with an inner dimension;
wherein the second arm is a hollow prism that is further defined with an outer dimension;
wherein the second arm is geometrically similar to the first arm;
wherein a span of the outer dimension of the second arm is lesser than the span of the inner dimension of the first arm such that the second arm inserts into the first arm in a telescopic fashion;
wherein a span of the length of the telescopic structure adjusts by adjusting a relative position of the second arm within the first arm;
wherein a position of the second arm relative to the first arm is held in position using the first detent.

4. The waste collection device according to claim 3
wherein the plurality of arms further comprises a third arm;
wherein the one or more detents further comprises a second detent;

wherein the second detent is a mechanical device that locks and secures the third arm to the second arm;
wherein the second arm is a hollow prism that is further defined with an inner dimension;
wherein the third arm is a hollow prism that is further defined with an outer dimension;
wherein the third arm is geometrically similar to the second arm;
wherein a span of the outer dimension of the third arm is lesser than a span of the inner dimension of the second arm such that the third arm inserts into the second arm in a telescopic fashion;
wherein a span of the length of the telescopic structure adjusts by adjusting a relative position of the third arm within the second arm;
wherein a position of the third arm relative to the second arm is held in position using the third detent.

5. The waste collection device according to claim 4
wherein the plurality of arms further comprises a fourth arm;
wherein the one or more detents further comprises a third detent;
wherein the third detent is a mechanical device that locks and secures the fourth arm to the third arm;
wherein the third arm is further defined with an inner dimension;
wherein the fourth arm is a hollow prism that is further defined with an outer dimension;
wherein the fourth arm is geometrically similar to the third arm;
wherein a span of the outer dimension of the fourth arm is lesser than a span of the inner dimension of the third arm such that the fourth arm inserts into the third arm in a telescopic fashion;
wherein a span of the length of the telescopic structure adjusts by adjusting a relative position of the fourth arm within the third arm;
wherein a position of the fourth arm relative to the third arm is held in position using the third detent.

6. The waste collection device according to claim 5
wherein the plurality of arms further comprises a fifth arm;
wherein the one or more detents further comprises a fourth detent;
wherein the fourth detent is a mechanical device that locks and secures the fifth arm to the fourth arm;
wherein the fourth arm is further defined with an inner dimension;
wherein the fifth arm is a hollow prism that is further defined with an outer dimension;
wherein the fifth arm is geometrically similar to the fourth arm;
wherein a span of the outer dimension of the fifth arm is lesser than a span of the inner dimension of the fourth arm such that the fifth arm inserts into the fourth arm in a telescopic fashion;
wherein a span of the length of the telescopic structure adjusts by adjusting a relative position of the fifth arm within the fourth arm;
wherein a position of the fifth arm relative to the fourth arm is held in position using the fourth detent.

7. The waste collection device according to claim 6
wherein the first arm further comprises the battery cap;
wherein the battery cap is a lid that is used to enclose the end of the first arm that is distal from the second arm.

8. The waste collection device according to claim 7
wherein the ring mount is a fastening apparatus;
wherein the ring mount is a rotating structure;
wherein the ring mount attaches the capture head to the telescopic structure such that the capture head rotates relative to the telescopic structure;
wherein the ring mount is a locking structure;
wherein the ring mount locks such that a cant between the capture head and the center axis of the telescopic structure can be fixed into position.

9. The waste collection device according to claim 8
wherein the ring mount comprises a rectilinear disk structure and a locking hinge;
wherein the locking hinge attaches to the rectilinear structure
wherein the ring mount is further defined with a cant.

10. The waste collection device according to claim 9
wherein the rectilinear disk structure is a disk-shaped structure formed in an irregular prism shape;
wherein the irregular prism shape of the rectilinear disk structure is a rectilinear block structure;
wherein the rectilinear disk structure attaches to the end of the fifth arm that is distal from the fourth arm;
wherein the rectilinear disk structure forms an anchor point to which the capture head attaches.

11. The waste collection device according to claim 10
wherein the locking hinge is a fastening structure;
wherein the locking hinge attaches the capture head to the ring mount such that the position of the capture head rotates relative to the ring mount;
wherein the locking hinge fixes the position of the capture head relative to the ring mount such that the cant between the capture head and the center axis of the telescopic structure is adjustable;
wherein the locking hinge adjusts the cant;
wherein the cant is an angle that is formed between the faces of the disk structure of the capture head and the center axis of the composite prism structure of the telescopic structure.

12. The waste collection device according to claim 11
wherein the capture head is a ring structure;
wherein the capture head is a disk-shaped structure;
wherein the ring structure of the capture head is configured to allow a companion animal to deposit excrement into the disposable collection bag through the open center of the capture head.

13. The waste collection device according to claim 12
wherein the capture head comprises a capture ring, a capture spring, and a fastening plate;
wherein the capture ring is a ring structure;
wherein the capture ring is a disk-shaped structure;
wherein the disposable collection bag attaches to the capture ring such that the disposable collection bag inserts through the center aperture of the capture ring;
wherein the capture ring is positioned relative to the companion animal such that the eliminated excrement will fall through the center aperture of the capture ring into the disposable collection bag;
wherein the capture spring is a semi-rigid structure;
wherein the capture spring attaches to the outer perimeter of the capture ring;
wherein the capture spring secures the disposable collection bag to the capture ring;
wherein the fastening plate is an irregular disk structure that attaches to the outer perimeter of the capture ring;
wherein the fastening plate forms the structure of the capture head that attaches to the ring mount;

wherein the locking hinge attaches the fastening plate to the rectilinear disk structure such that the fastening plate rotates relative to the rectilinear disk structure.

14. The waste collection device according to claim 13 wherein the capture ring comprises a perimeter groove, an inner perimeter, and an outer perimeter;
wherein the perimeter groove is a slot that is formed in the outer perimeter of the capture ring;
wherein the outer perimeter forms the lateral face of the disk structure of the capture head;
wherein the inner perimeter is the perimeter of the aperture that creates the ring aperture formed through the capture ring.

15. The waste collection device according to claim 14 wherein the capture spring comprises a semi-rigid shaft and a finger loop;
wherein the semi-rigid shaft is a semi-rigid structure;
wherein the semi-rigid shaft has an elastic nature;
wherein the semi-rigid shaft has a prism shape;
wherein a congruent end of the prism structure of the semi-rigid shaft attaches to the outer perimeter of the capture ring in the manner of a cantilever;
wherein the finger loop is a loop that is formed in the free end of the semi-rigid shaft.

16. The waste collection device according to claim 15 wherein the perimeter groove is sized such that the semi-rigid shaft compresses when the semi-rigid shaft inserts into the perimeter groove;
wherein the elastic nature of the semi-rigid shaft acts as a spring;
wherein the semi-rigid shaft inserts between the edges of the perimeter groove such that a compressive force is applied to the semi-rigid shaft.

17. The waste collection device according to claim 16 wherein when the disposable collection bag is positioned between the semi-rigid shaft and the perimeter groove, the semi-rigid shaft attach the disposable collection bag to the capture head.

18. The waste collection device according to claim 17 wherein the lamp is an electric circuit;
wherein the lamp generates illumination;
wherein the lamp comprises a battery, a switch, a limit resistor, and one or more LEDs;
wherein the battery, the switch, the limit resistor, and the one or more LEDs are electrically connected to form a series circuit.

* * * * *